(12) United States Patent       (10) Patent No.:     US 7,531,912 B2
Tamura et al.                   (45) Date of Patent:     May 12, 2009

(54) POWER SUPPLY CONTROL SYSTEM (75) Inventors: Hiroshi Tamura, Nagoya (JP);
Kazuyoshi Obayashi, Chita-gun (JP);
Atsushi Inaba, Kariya (JP); Hironori Asa, Okazaki (JP); Katsunori Tanaka, Haguri-gun (JP)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 11/634,022

(22) Filed: Dec. 5, 2006

(65) Prior Publication Data
US 2007/0126236 A1   Jun. 7, 2007

(30) Foreign Application Priority Data
Dec. 6, 2005    (JP) ............................. 2005-352668

(51) Int. Cl.
H02P 9/04   (2006.01)
F02N 11/06  (2006.01)
(52) U.S. Cl. ...................... 290/51; 290/40 R; 290/40 C
(58) Field of Classification Search ............... 290/40 R, 290/40 C, 52, 51; 322/59, 46, 28, 89; 307/10.1, 307/10.6
See application file for complete search history.

(56) References Cited
U.S. PATENT DOCUMENTS

| | | | |
|---|---|---|---|
| 4,453,114 A * | 6/1984 | Nordlund | .................... 318/376 |
| 7,100,369 B2 * | 9/2006 | Yamaguchi et al. | ........... 60/324 |
| 7,463,949 B2 * | 12/2008 | Tani et al. | .................... 700/286 |
| 2004/0238244 A1 * | 12/2004 | Amanuma et al. | ......... 180/65.2 |
| 2005/0021191 A1 * | 1/2005 | Taniguchi et al. | ............... 701/1 |
| 2006/0113799 A1 * | 6/2006 | Obayashi et al. | .......... 290/40 B |
| 2006/0179820 A1 * | 8/2006 | Sullivan | ..................... 60/275 |
| 2007/0021267 A1 * | 1/2007 | Obayashi et al. | ............ 477/107 |
| 2007/0145924 A1 * | 6/2007 | Obayashi | .................... 318/376 |
| 2008/0097664 A1 * | 4/2008 | Aoyama et al. | ............... 701/36 |
| 2008/0223632 A1 * | 9/2008 | Bartilson | ................... 180/65.2 |

FOREIGN PATENT DOCUMENTS

| | | |
|---|---|---|
| JP | 10-309002 | 11/1998 |
| JP | 2005-075259 | 3/2005 |
| JP | 2006347486 A | * 12/2006 |

* cited by examiner

*Primary Examiner*—Julio Gonzalez
(74) *Attorney, Agent, or Firm*—Harness, Dickey & Pierce, PLC (57) ABSTRACT A power supply control system for a vehicle includes a supply line system, a first electric generating means, a second electric generating means, and a control means. The first electric generating means generates electricity through use of a mechanical drive force of a drive source of the vehicle, which drives the vehicle to run. The second electric generating means generates electricity through use of a heat energy. The first and second electric generating means are connected to the supply line system. The control means controls the first electric generating means and the second electric generating means.

8 Claims, 11 Drawing Sheets

FIG. 11

POWER SUPPLY CONTROL SYSTEM

CROSS REFERENCE TO RELATED APPLICATION

This application is based on and incorporates herein by reference Japanese Patent Application No. 2005-352668 filed on Dec. 6, 2005.

BACKGROUND OF THE INVENTION

1. Field of the Invention

The present invention relates to a power supply control system for a vehicle.

2. Description of Related Art

Recently, many electrical apparatuses and electronic devices are installed in a vehicle, and their electric power demand is tending on the rise. Under such circumstances, a conventional method, whereby electricity is generated through operating a generator only by mechanical power of an engine, has caused concern about deterioration in gas mileage and acceleration performance by consuming most of the engine mechanical power on generating electricity, and about a decrease in a supply voltage and exhaustion of a battery due to a supply power shortage.

Accordingly, an art (e.g., JP10-309002A) is proposed to seek to solve the above problem by recovering energy other than the engine mechanical power, particularly the energy that is conventionally wasted, and generating electricity (i.e., by regenerating the energy). For example, according to JP10-309002A, a regenerative deceleration device generates electricity from kinetic energy at a decelerating time of the vehicle.

Besides the regenerative deceleration device in JP10-309002A, an exhaust heat generator, which generates electricity from heat energy of a coolant of the engine, is proposed. The exhaust thermoelectric generator employs a Rankine cycle of condensation and expansion of a refrigerant. More specifically, the refrigerant is expanded by the heat energy of the engine coolant, and then the kinetic energy generated from the expansion of the refrigerant is converted into rotational energy by an expander, thereby driving the generator to generate electricity. On the assumption that the exhaust thermoelectric generator is connected to a power supply system of the vehicle to supply electric power (exhaust thermoelectrically generated power) generated from exhaust heat, if the exhaust thermoelectrically generated power is smaller than the electric power required for an electric load of the vehicle (an electric power load of the vehicle), a difference between the electric power load and the exhaust thermoelectrically generated power can be generated by an alternator through voltage control by a regulator of the alternator of the vehicle. Consequently, the electric power generated by the alternator (mechanically generated electric power that is generated from the engine mechanical power by the alternator) becomes smaller by as much electric power as is generated from the exhaust heat, thereby reducing a load applied to the alternator and thus saving an engine fuel.

Nevertheless, in supplying the exhaust thermoelectrically generated power to the power supply system of the vehicle, in which the regenerative deceleration device in JP10-309002A is installed, if the electric power, which is supplied both by the regenerative deceleration device and by the electric power from the exhaust heat, exceeds an upper voltage limit of the power supply system, the power supply system cannot receive both the electric power at once, thereby reducing an effect of regenerative deceleration (or exhaust thermoelectric generation).

In such a case, the power supply system is allowed to increase the electric power that can receive both the electric power at once by raising an upper limit of a regulated voltage in controlling the voltage by the regulator. On the other hand, the battery is slightly overcharged, thereby shortening a life of the battery. Furthermore, although high-performance batteries such as a lithium battery and a nickel metal hydride (NiMH) battery may be employed in place of batteries that are poor in receiving a charge, such as a lead battery, adopting such high-performance batteries creates high production costs.

Moreover, if the exhaust thermoelectrically generated power is larger than the electric power required for the electric load of the vehicle, the alternator does not need to generate electricity at all, whereas the electric power generated by means of the regenerative deceleration is not received either. On the other hand, since the exhaust thermoelectric generation removes heat from the engine coolant, an excessive reduction in a coolant temperature due to undue electric generation may not only reduce the amount of the electric generation, but also have an adverse effect on the gas mileage and an emission.

SUMMARY OF THE INVENTION

The present invention addresses the above disadvantages. Thus, it is an objective to provide a power supply control system that can improve gas mileage of a vehicle by recovering energy efficiently.

To achieve the objective of the present invention, there is provided a power supply system for a vehicle. The power supply system includes a supply line system, a first electric generating means, a second electric generating means, and a control means. The first electric generating means generates electricity through use of a mechanical drive force of a drive source of the vehicle, which drives the vehicle to run. The first electric generating means is connected to the supply line system. The second electric generating means generates electricity through use of a heat energy. The second electric generating means is connected to the supply line system. The control means controls the first electric generating means and the second electric generating means. The control means operates the first electric generating means to generate the electricity when a voltage of the supply line system is below a first threshold voltage. The control means stops the first electric generating means when the voltage of the supply line system is equal to or greater than the first threshold voltage. The control means operates the second electric generating means to generate the electricity when the voltage of the supply line system is below a second threshold voltage, which is different from the first threshold voltage. The control means stops the second electric generating means when the voltage of the supply line system is equal to or greater than the second threshold voltage.

To achieve the objective of the present invention, there is also provided a power supply system for a vehicle. The power supply system includes a supply line system, a first electric generating means, a second electric generating means, a third electric generating means, and a control means. The first electric generating means generates electricity through use of a mechanical drive force of a drive source of the vehicle, which drives the vehicle to run. The first electric generating means is connected to the supply line system. The second electric generating means generates electricity through use of a heat energy. The second electric generating means is connected to the supply line system. The third electric generating means generates electricity through use of a regenerative braking force of the vehicle. The third electric generating means is connected to the supply line system. The control means controls the first electric means, the second electric generating means and the third electric generating means. The control means limits or stops generation of the electricity from the second electric generating means when the third electric generating means is operated to generate the electricity.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

With reference to drawings, an embodiment of a power supply control system of the present invention will be described below. In the embodiment, while an application of the power supply control system installed in an automobile will be described, yet the power supply control system is not only applied to the automobile, but can be applied to any other vehicle (e.g., a railway vehicle) having a heat source.

Figure 1:
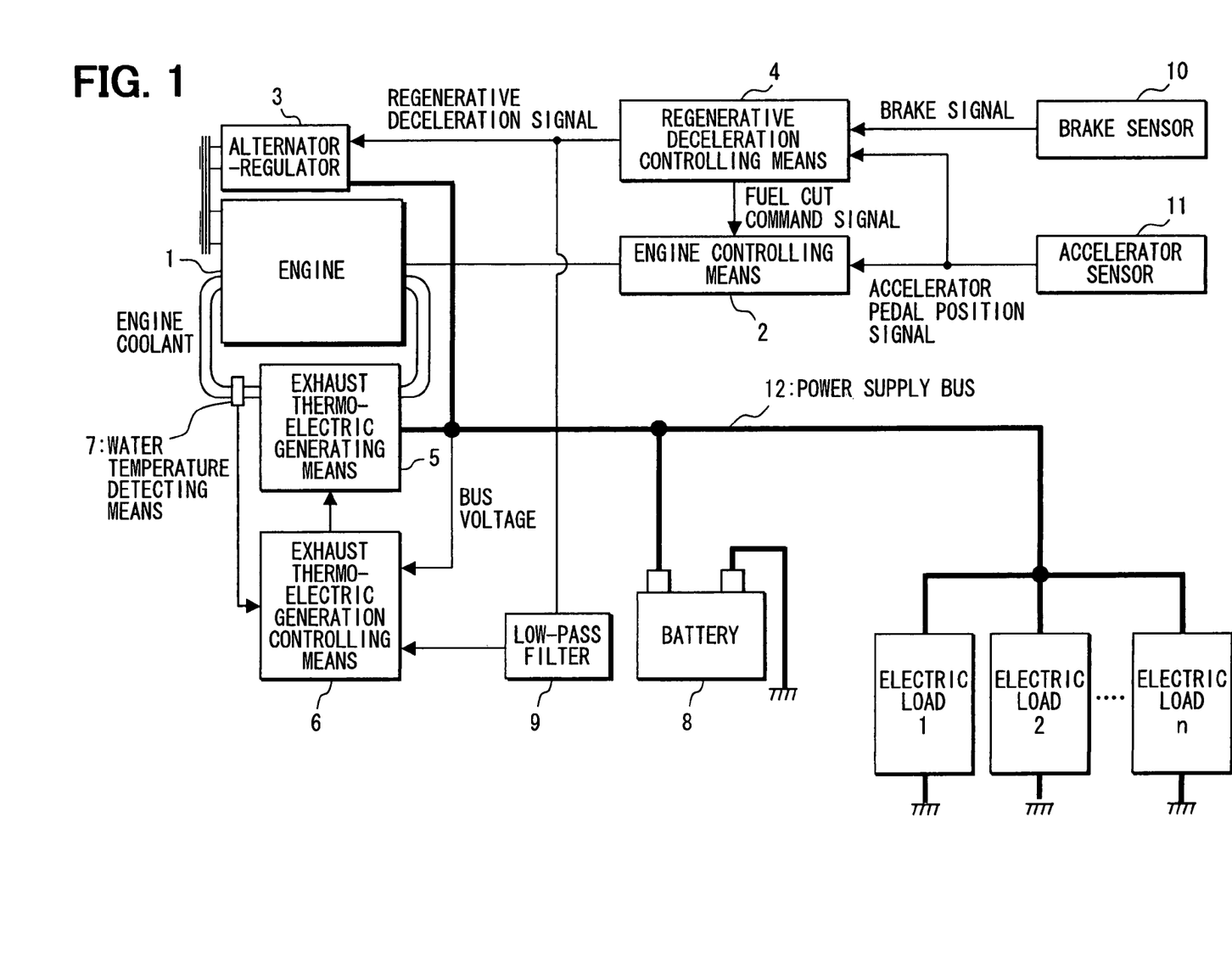
FIG. 1 is a block diagram showing an electric system of a vehicle according to an embodiment of the present invention.

FIG. 1 is a block diagram showing an electric system of the vehicle according to the embodiment. An engine 1, an engine controlling means 2, an alternator-regulator 3, a regenerative deceleration controlling means 4, an exhaust thermoelectric generating means 5, an exhaust thermoelectric generation controlling means 6, a water temperature detecting means 7, a battery 8, a low-pass filter 9, a brake sensor 10, an accelerator sensor 11, and a number (k) of electric loads (k=1, 2, ..., n) are connected, and included in the electric system of the vehicle.

The engine 1 is an internal-combustion engine that uses gasoline, a light oil or the like as fuel, and is coupled to the alternator-regulator 3 through a belt. The alternator-regulator 3 and the exhaust thermoelectric generating means 5 are connected to the battery 8 and the number (k) of electric loads through a power supply bus 12 (a supply line system). The engine controlling means 2 is a control device for controlling the engine 1, and controls an output of the engine 1 based on various pieces of information such as an engine rotational speed, which is detected by a sensor (not shown) that detects various states of the engine 1.

The alternator-regulator 3 includes a known alternator and a regulator that controls a voltage. The alternator is a generator that generates electricity from mechanical power of the engine 1. The regulator controls the voltage, such that a bus voltage of the power supply bus 12 coincides with a predetermined regulated voltage, to supply mechanically generated electric power that is generated from the engine mechanical power by the alternator to the power supply bus 12.

Also, the alternator-regulator 3 is constructed to generate electricity from kinetic energy (a regenerative braking force) at a decelerating time of the vehicle (i.e., to perform regenerative deceleration). On receiving a regenerative deceleration signal from the regenerative deceleration controlling means 4, the alternator-regulator 3 sets the regulated voltage of the bus voltage of the power supply bus 12 at a slightly higher voltage than normal to supply as much regenerative deceleration power as possible to the power supply bus 12. At the same time, the regenerative deceleration signal from the regenerative deceleration controlling means 4 is transmitted to the exhaust thermoelectric generation controlling means 6 through the low-pass filter 9. On receiving the regenerative deceleration signal, the exhaust thermoelectric generation controlling means 6 controls exhaust thermoelectrically generated power produced by the exhaust thermoelectric generating means 5 to be either 0 (zero) or a minimum.

The regenerative deceleration controlling means 4 determines whether the vehicle is decelerating (or descending a slope) based on a brake signal, an accelerator pedal position signal, a vehicle speed signal from a vehicle speed sensor (not shown) that detects a vehicle speed, and the like. The brake signal is transmitted from the brake sensor 10 that detects the amount of a brake pedal depression. The accelerator pedal position signal is transmitted from the accelerator sensor 11 that detects a throttle valve opening degree (or the amount of an accelerator pedal depression). If the vehicle is decelerating, the regenerative deceleration controlling means 4 transmits a fuel cut command signal to command a cutoff of the fuel to be used in an injector (not shown) to the engine controlling means 2, as well as transmitting the regenerative deceleration signal at an active level (H: High) to perform the regenerative deceleration.

In addition to the brake signal, the accelerator pedal position signal, the vehicle speed signal and the like, those means which detect a change in the vehicle speed or in an accelerator pedal position, or the fuel cut command signal, for example, may be employed as a means for detecting deceleration of the vehicle. As well, a descent may be predicted or detected by using map data used by a navigation device, the present position of the vehicle by a global positioning system (GPS), an inclination sensor that detects an inclination of the vehicle around its horizontal axis, or the like.

The low-pass filter 9 delays a response of the exhaust thermoelectric generation controlling means 6 to the outputted regenerative deceleration signal relative to that of the alternator-regulator 3 to the outputted regenerative deceleration signal. A resulting difference in the response to the outputted regenerative deceleration signal between the alternator-regulator 3 and the exhaust thermoelectric generation controlling means 6 can reduce an interference between power generation by the alternator-regulator 3 and that by the exhaust thermoelectric generation controlling means 6, and chattering of the controlling in the exhaust thermoelectric generation controlling means 6.

Figure 2:
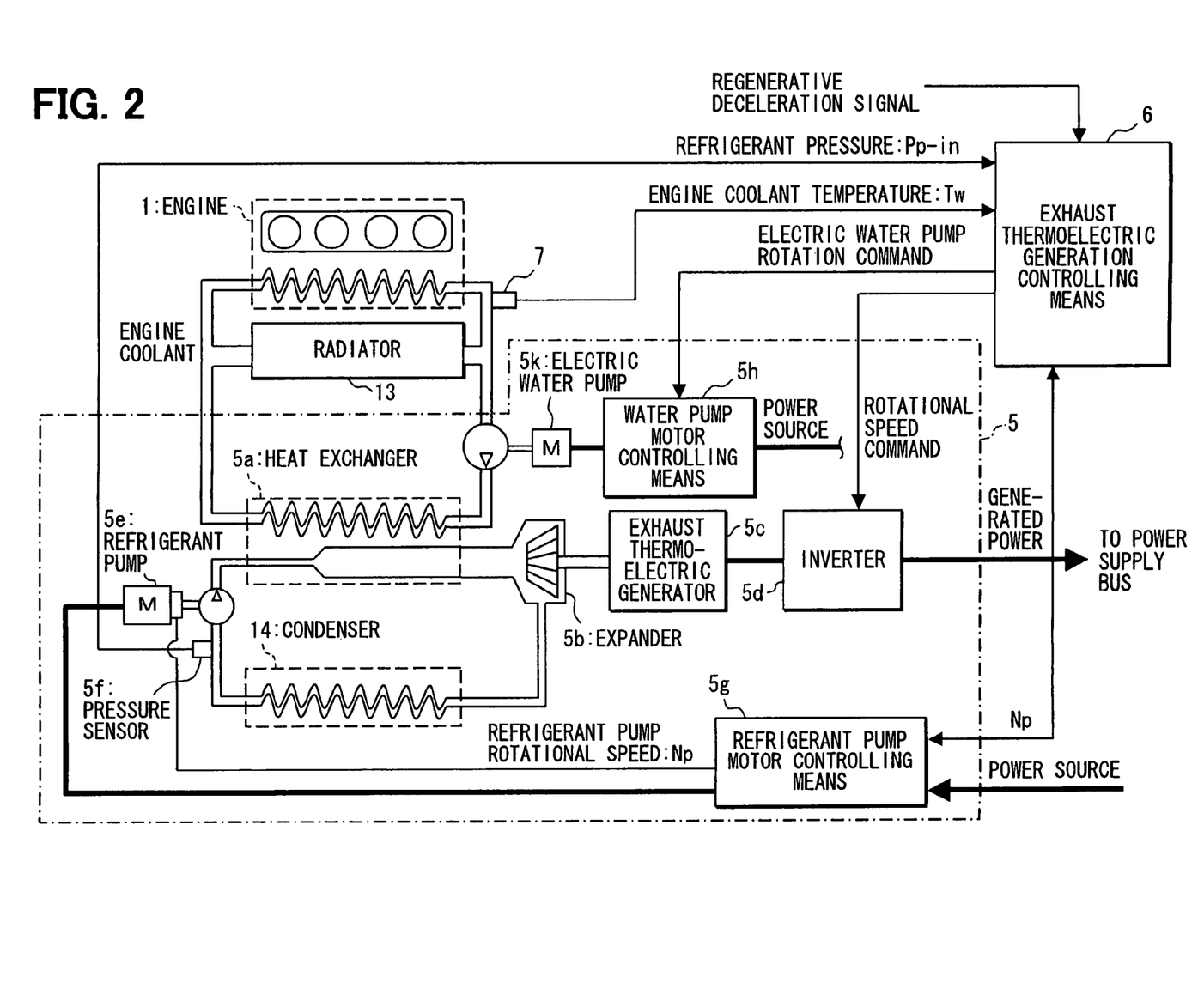
FIG. 2 is a schematic diagram illustrating a construction of an exhaust thermoelectric generating means.

FIG. 2 illustrates a construction of the exhaust thermoelectric generating means 5. The exhaust thermoelectric generating means 5 of the present embodiment carries out exhaust thermoelectric generation through a condensation-expansion cycle of a refrigerant. More specifically, the refrigerant in a heat exchanger 5a absorbs heat energy of a coolant of the engine, which circulates through engine 1, radiator 13, and heat exchanger 5a. Then, the refrigerant expands with the heat energy of the engine coolant in an expander 5b. Consequently, the kinetic energy of the refrigerant drives an exhaust thermoelectric generator 5c, thereby generating electricity.

A refrigerant pump 5e circulates the refrigerant in the expander 5b and a condenser 14. The refrigerant pump 5e transmits information about a refrigerant pump rotational speed (Np) to a refrigerant pump motor controlling means 5g, and is controlled by the refrigerant pump motor controlling means 5g. The refrigerant pump motor controlling means 5g transmits the information about the refrigerant pump rotational speed ($N_p$) to the exhaust thermoelectric generation controlling means 6.

A pressure sensor 5f detects a refrigerant pressure ($P_{p-in}$) at a suction opening of the refrigerant pump 5e, and transmits information about the refrigerant pressure ($P_{p-in}$) to the exhaust thermoelectric generation controlling means 6. The water temperature detecting means 7 detects an engine coolant temperature ($T_w$) and transmits information about the engine coolant temperature ($T_w$) to the exhaust thermoelectric generation controlling means 6.

The exhaust thermoelectric generation controlling means 6 transmits a rotational speed command to an inverter 5d. Then, the inverter 5d controls the exhaust thermoelectric generator 5c to rotate at a rotational speed that accords with the rotational speed command. Additionally, the inverter 5d has a voltage regulating function and controls the exhaust thermoelectrically generated power to be the predetermined regulated voltage. The exhaust thermoelectric generation controlling means 6 transmits an electric water pump rotation command to a water pump motor controlling means 5h. Then, in response to the electric water pump rotation command, the water pump motor controlling means 5h controls an electric water pump 5k.

Next, with reference to a flowchart in FIG. 3, generated power control processing in the exhaust thermoelectric generation controlling means 6 will be described below. To begin with, at step SI 0, maximum power (power supply capacity: $W_{TG\_MAX}$) that can be generated through the exhaust thermoelectric generation by the exhaust thermoelectric generating means 5 is calculated based on the present operational state of the vehicle.

Figure 5:
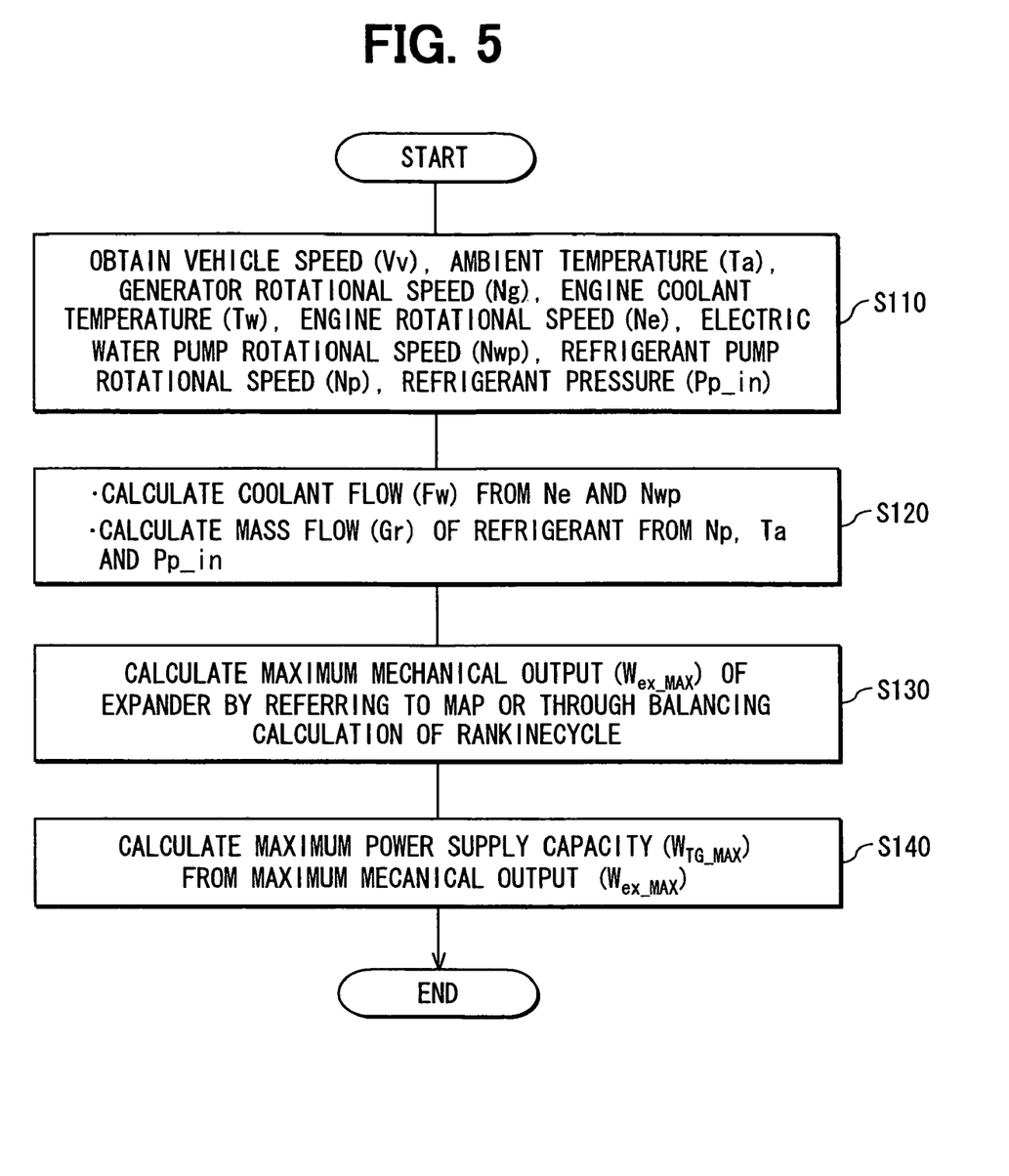
FIG. 5 is a flowchart showing calculation processing of a maximum power supply capacity of the exhaust thermoelectric generating means.

More specifically, by referring to a flowchart in FIG. 5, calculation processing (S10) of the maximum power supply capacity ($W_{TG\_MAX}$) of the exhaust thermoelectric generating means 5 will be described below. At step S110, the vehicle speed ($V_v$), an ambient temperature ($T_a$), a generator rotational speed ($N_g$) of the exhaust thermoelectric generator 5c, the engine coolant temperature ($T_w$), the engine rotational speed ($N_e$), an electric water pump rotational speed ($N_{wp}$), the refrigerant pump rotational speed ($N_p$), and the refrigerant pressure ($P_{p-in}$) are obtained.

At step S120, a coolant flow ($F_w$) is calculated from the engine rotational speed ($N_e$) and the electric water pump rotational speed ($N_{wp}$). A mass flow ($G_r$) of the refrigerant is calculated as a result of multiplying refrigerant density ($\rho$) that is calculated from the ambient temperature ($T_a$) and the refrigerant pressure ($P_{p-in}$), by the refrigerant pump rotational speed ($N_p$), delivery volume (vp), and pump efficiency ($\eta p$).

At step S130, a maximum mechanical output ($W_{ex\_MAX}$) of the expander 5b, which functions as a power source of the exhaust thermoelectrically generated power in the present operational state of the vehicle, is calculated from results of the calculations performed at steps S110, S120. Alternatively, the maximum mechanical output ($W_{ex\_MAX}$) may be calculated through balancing calculation of a Rankine cycle applied to the refrigerant, or through a map of its correlation with each one of variables of the refrigerant pressure ($P_{p-in}$) at the suction opening of the refrigerant pump 5e, the mass flow ($G_r$), and the engine coolant temperature ($T_w$). At step S140, the maximum power supply capacity ($W_{TG\_MAX}$) of the exhaust thermoelectric generating means 5 is obtained by multiplying the maximum mechanical output ($W_{ex\_MAX}$) of the expander 5b by generator efficiency ($\eta G$).

Figure 3:
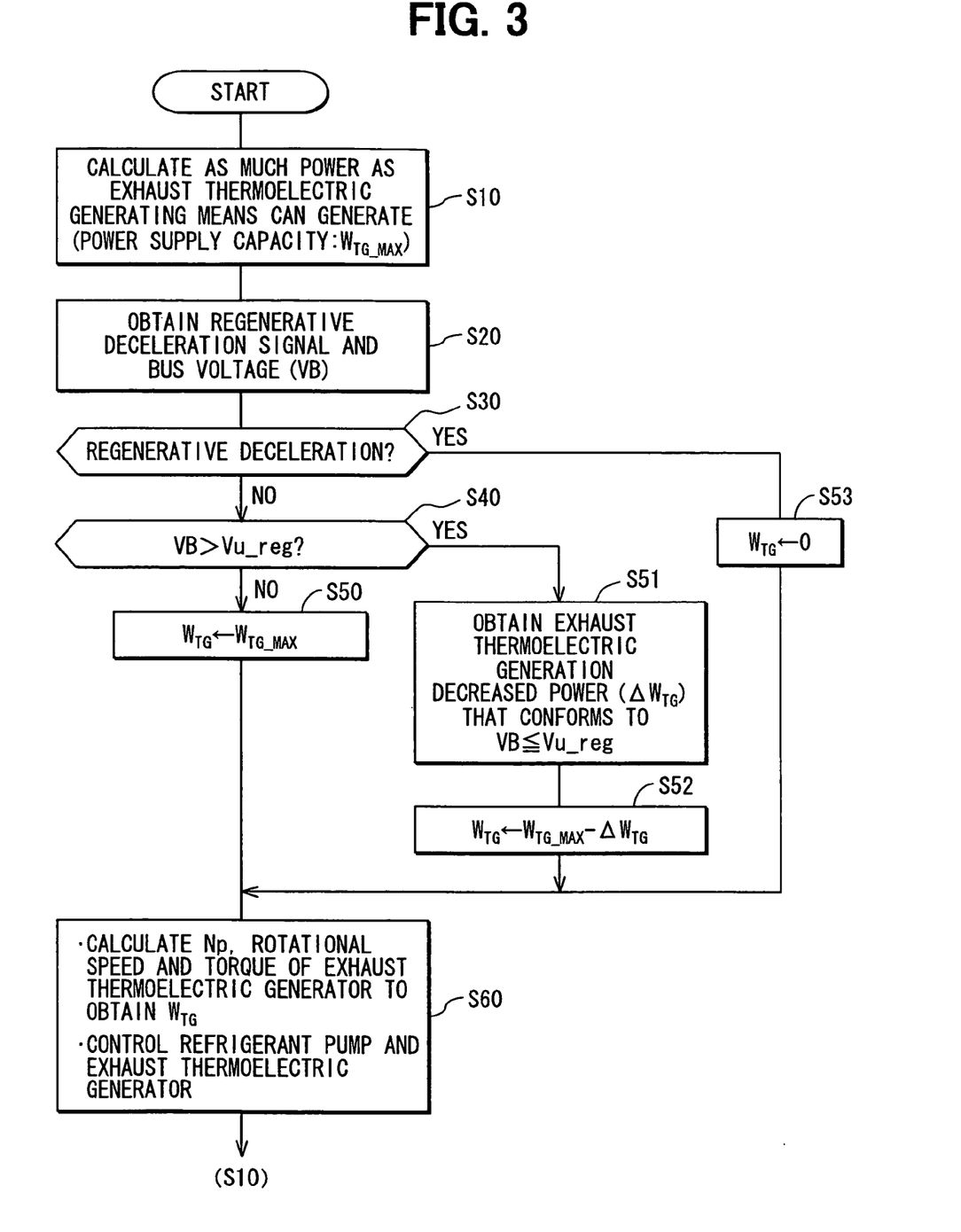
FIG. 3 is a flowchart showing a flow of generated power control processing in an exhaust thermoelectric generation controlling means.

At step S20 in FIG. 3, the regenerative deceleration signal and the present bus voltage (VB) of the power supply bus 12 are obtained. At step S30, it is determined whether the vehicle is decelerating (or descending the slope). If the regenerative deceleration signal is at the active level (H) (S30: Yes), the vehicle is determined to be decelerating, and control proceeds to step S53. At step S53, the exhaust thermoelectrically generated power ($W_{TG}$) is set at 0 (zero), and control proceeds to step S60.

Meanwhile, at step S30, if the regenerative deceleration signal is at a passive level (L) (S30: No), the vehicle is determined to not be decelerating (i.e., accelerating or running at a constant speed) and control proceeds to step S40. At step S40, it is determined whether the bus voltage (VB) exceeds an upper limit voltage (a third threshold voltage) ($V_{u\_reg}$) of the regulated voltage, which is set for the regenerative deceleration.

If the bus voltage (VB) is determined to not exceed the regenerative deceleration upper limit voltage ($V_{u\_reg}$) at step S40 (No), the exhaust thermoelectrically generated power ($W_{TG}$) is set at the maximum power supply capacity ($W_{TG\_MA}$) of the exhaust thermoelectric generating means 5 at step S50, and control proceeds to step S60. On the other hand, if the bus voltage (VB) is determined to exceed the regenerative deceleration upper limit voltage ($V_{u\_reg}$) at step S40 (Yes), exhaust thermoelectric generation decreased power ($\Delta W_{TG}$), which conforms to an inequality (the bus voltage (VB)≦the regenerative deceleration upper limit voltage ($V_{u\_reg}$)), is obtained at step S51.

At step S52, the exhaust thermoelectrically generated power ($W_{TG}$) is calculated by subtracting the exhaust thermoelectric generation decreased power ($\Delta W_{TG}$) from the maximum power supply capacity ($W_{TG\_MAX}$) of the exhaust thermoelectric generating means 5, and control proceeds to step S60.

At step S60, the refrigerant pump rotational speed ($N_p$), and the rotational speed and a rotary torque of the exhaust thermoelectric generator 5c are controlled in order to obtain the exhaust thermoelectrically generated power ($W_{TG}$), which is calculated as a result of the processing performed at steps S10 to S53. For instance, to make large the exhaust thermoelectrically generated power ($W_{TG}$), target values of the refrigerant pump rotational speed ($N_p$) and the rotational speed of the exhaust thermoelectric generator 5c may be made large. In this manner, by controlling the exhaust thermoelectric generator 5c and the refrigerant pump 5e, the exhaust thermoelectrically generated power ($W_{TG}$) can be supplied to the power supply bus 12.

If the exhaust thermoelectrically generated power ($W_{TG}$) is 0 (zero) at step S60, the exhaust thermoelectric generator 5c may be idled at a slow rotational speed so that the exhaust thermoelectrically generated power ($W_{TG}$) is reduced to approximately 0 (zero), instead of stopping drive of the exhaust thermoelectric generator 5c. Consequently, even if the exhaust thermoelectrically generated power ($W_{TG}$) coincides with the maximum power supply capacity ($W_{TG\_MAX}$) (>0 (zero)) of the exhaust thermoelectric generating means 5 after the deceleration of the vehicle is ended, the exhaust thermoelectric generation can be promptly carried out.

In addition, the regenerative deceleration upper limit voltage ($V_{u\_reg}$) is set at a voltage, which is slightly higher than a normal regulated voltage (a first threshold voltage) ($V_{a\_reg}$) that is set for the engine mechanical power generation (e.g., in the case of the power supply bus 12 at a voltage of 12 [V], the alternator-regulator regulated voltage ($V_{a\_reg}$) may be set at a voltage of approximately 13.5[V], and the regenerative deceleration upper limit voltage ($V_{u\_reg}$) may be set at a voltage of approximately 14.5[V] at a room temperature). Besides, in the case of the power supply bus 12 at a voltage of 24[V] or 42[V], or a vehicle (e.g., a hybrid vehicle) in which a high-voltage (200[V] to 300[V]) power supply system is installed, the regenerative deceleration upper limit voltage ($V_{u\_reg}$) is set according to their bus voltages.

Figure 4:
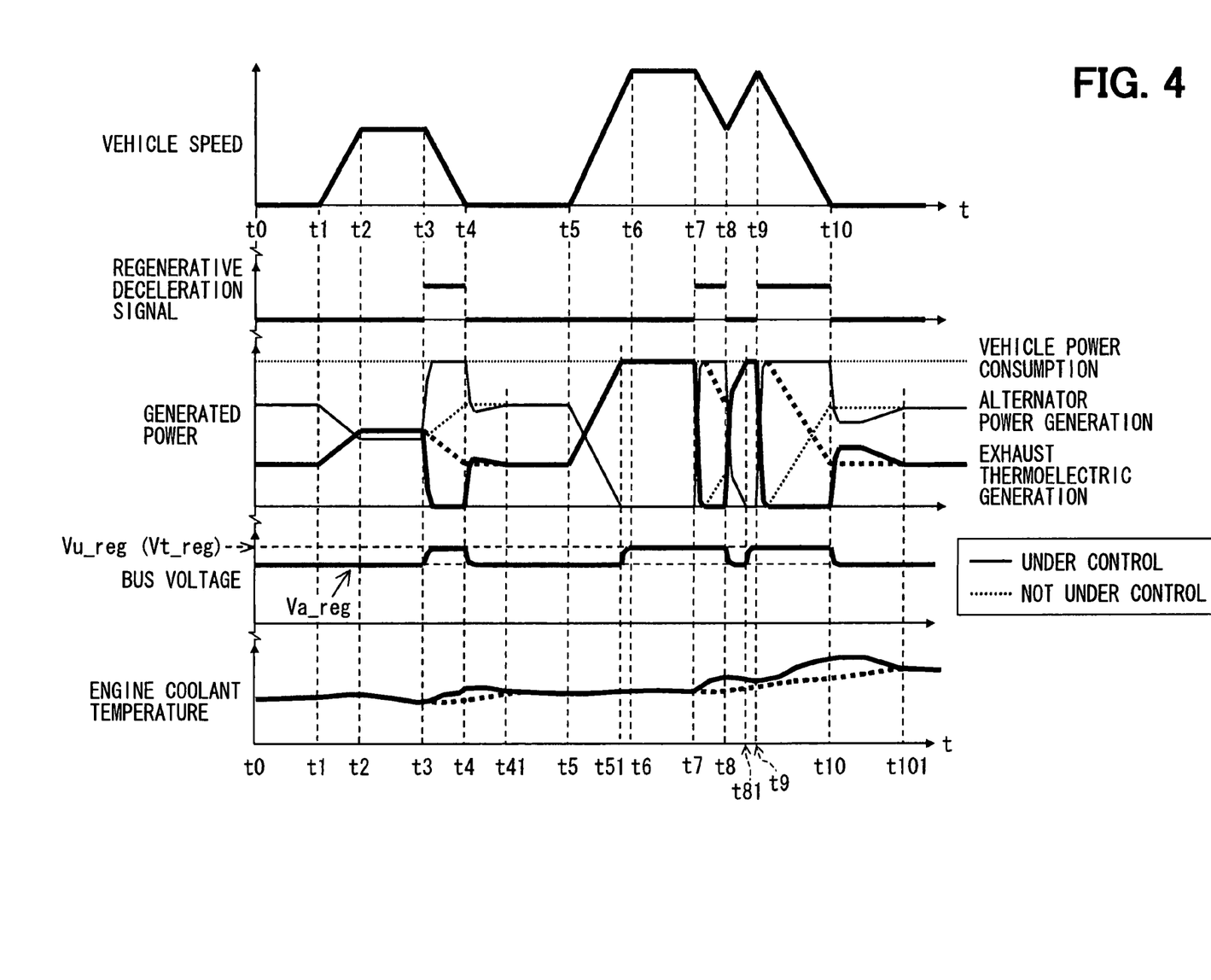
FIG. 4 is a time chart showing an operation of an electric system of a vehicle corresponding to a running pattern of the vehicle according to the embodiment of the present invention.

Time charts in FIG. 4 show an operation of the electric system of the vehicle corresponding to a running pattern of the vehicle according to the present embodiment. In the charts, it is assumed that power consumption is constant, and that the sum of the exhaust thermoelectric generation and the power generation (alternator power generation) by the alternator-regulator 3 is thus constant. It is indicated in FIG. 4 that the vehicle is stopped (idled) during a time (t0-t1), (t4-t5) and after a time (t10), and that the vehicle is accelerating during a time (t1-t2), (t5-t6), (t8-t9). As well, it is shown that the vehicle is running at the constant speed during a time (t2-t3), (t6-t7), and that the vehicle is decelerating during a time (t3-t4), (t7-t8), (t9-t10).

Although a little exhaust thermoelectric generation can be performed even when the vehicle is stopped as long as the engine 1 is driven, a larger amount of exhaust heat of the engine 1, and a larger amount of heat to be cooled by the condenser 14 can be extracted as the vehicle speed becomes higher, thereby generating electricity from a larger amount of energy using the Rankine cycle. Therefore, the exhaust thermoelectrically generated power ($W_{TG}$) basically increases or decreases according to a high or low speed of the vehicle, and alternator generated power decreases or increases according to an increase or decrease in the exhaust thermoelectrically generated power ($W_{TG}$).

More specifically, a part of the vehicle power consumption, which cannot be supplied only by the exhaust thermoelectrically generated power ($W_{TG}$), is compensated with the alternator power generation until the bus voltage reaches the alternator-regulator regulated voltage ($V_{a\_reg}$) of the alternator-regulator 3 (the engine mechanical power), thereby keeping constant the sum (i.e., the vehicle power consumption) of the exhaust thermoelectrically generated power ($W_{TG}$) and the alternator generated power. Also, if the exhaust thermoelectrically generated power ($W_{TG}$) exceeds the vehicle power consumption, the bus voltage increases even when the alternator generated power is reduced to 0 (zero). Thus, to keep the above sum constant, voltage control is performed on the exhaust thermoelectrically generated power ($W_{TG}$) at a regulated voltage (a second threshold voltage) ($V_{t\_reg}$) by the inverter 5d. In addition, by conforming the regulated voltages by means of the alternator-regulator 3 and the inverter 5d to an inequality (the alternator-regulator regulated voltage ($V_{a\_reg}$) < the inverter regulated voltage ($V_{t\_reg}$)), priority is placed on the exhaust thermoelectric generation, and thus the alternator power generation plays an auxiliary role in supplying the vehicle power consumption.

On the other hand, while the vehicle is decelerating, the priority is placed on the power generation through the regenerative deceleration by the alternator-regulator 3 over the exhaust thermoelectric generation in order to take full advantage of the regenerative deceleration. Hence, if the regenerative deceleration signal is at the active level (H) (i.e., the power generation through the regenerative deceleration is being carried out), the regulated voltage of the alternator-regulator 3 is set at $V_{u\_reg}$ (=$V_{a\_reg}$ (which is set for the engine mechanical power generation)+α), and the exhaust thermoelectrically generated power ($W_{TG}$) is set at 0 (zero).

Consequently, the alternator-regulator 3 is allowed to generate electricity from the kinetic energy at the decelerating time of the vehicle to the fullest extent until the regulated voltage ($V_{u\_reg}$) (which is set for the regenerative deceleration) is reached, thereby saving the fuel for the engine 1. Furthermore, by setting the exhaust thermoelectrically generated power ($W_{TG}$) at 0 (zero) while the vehicle is decelerating, the exhaust heat that is to be used for the exhaust thermoelectric generation can be retained, thereby raising the engine coolant temperature ($T_w$). When the deceleration is ended, the exhaust thermoelectric generation can be resumed in the high engine coolant temperature ($T_w$). Because of this, the amount of the power that is generated through the exhaust thermoelectric generation can be increased. As a result, what is termed a thermal storage effect can be created.

Next, according to the elapse of time, the time charts in FIG. 4 will be described below. During the time (t0-t1), the vehicle is idled, and thus a small amount of the exhaust thermoelectrically generated power ($W_{TG}$) is produced, while most of the vehicle power consumption is generated from the engine mechanical power by the alternator-regulator 3. The bus voltage of the power supply bus 12 is kept at a voltage of the normal regulated voltage ($V_{a\_reg}$) of the alternator-regulator 3.

The vehicle is accelerating during the time (t1-t2), the exhaust thermoelectrically generated power ($W_{TG}$) increases, and consequently the alternator generated power decreases. During the time (t2-t3), the vehicle is running at a low constant speed, and the exhaust thermoelectrically generated power ($W_{TG}$) exceeds the alternator generated power. Nevertheless, it does not go so far as to cover the whole vehicle power consumption.

The vehicle is decelerating during the time (t3-t4), so that the regenerative deceleration signal is at the active level (H). Thus, the exhaust thermoelectrically generated power ($W_{TG}$) is reduced to 0 (zero), and the regulated voltage that is set for the alternator-regulator 3 is changed to a voltage of $V_{u\_reg}$ (=$V_{a\_reg}$+α) to perform the power generation through the regenerative deceleration by the alternator-regulator 3. In addition, a dotted line indicates a state in which control is not performed. As the dotted lines show, the exhaust thermoelectrically generated power ($W_{TG}$) decreases as the vehicle decelerates, and the power generation through the regenerative deceleration by the alternator-regulator 3 is limited to the result of subtraction of the exhaust thermoelectrically generated power ($W_{TG}$) from the vehicle power consumption.

As during the time (t0-t1), the vehicle is idled during the time (t4-t5). However, during a time (t4-t41), the engine coolant temperature ($T_w$) rises as a result of setting the exhaust thermoelectrically generated power ($W_{TG}$) at 0 (zero) during the time (t3-t4), which is immediately before the time (t4-t41). Accordingly, as the time chart in FIG. 4 shows, the exhaust thermoelectrically generated power ($W_{TG}$) is slightly larger compared to the case of not being under control.

During the time (t5-t6), the vehicle is accelerating similar to the time (t1-t2), so that the exhaust thermoelectrically generated power ($W_{TG}$) increases. Nonetheless, since the exhaust thermoelectrically generated power ($W_{TG}$) exceeds the vehicle power consumption at a time (t51), the alternator generated power is reduced to 0 (zero), and therefore the voltage control cannot be performed on the alternator-regulator 3 at the alternator-regulator regulated voltage ($V_{a\_reg}$), which is set for the engine mechanical power generation. Accordingly, the increase in the generated power is restricted through the voltage control at the regulated voltage ($V_{t\_reg} = V_{u\_reg}$) by the inverter 5d. In consequence, the bus voltage of the power supply bus 12 increases to the regulated voltage ($V_{u\_reg}$).

The vehicle is running at a high constant speed during the time (t6-t7), so that the exhaust thermoelectrically generated power ($W_{TG}$) constitutes the entire vehicle power consumption. The bus voltage of the power supply bus 12 is controlled to be the regulated voltage ($V_{u\_reg}$), which is higher than normal. During the time (t7-t8), the vehicle is decelerating, so that the regenerative deceleration signal is at the active level (H). Hence, the exhaust thermoelectrically generated power ($W_{TG}$) is reduced to 0 (zero), and the regulated voltage that is set for the alternator-regulator 3 is changed to the voltage of $V_{u\_reg}$ ($= V_{a\_reg} + \alpha$) to perform the power generation through the regenerative deceleration by the alternator-regulator 3.

As during the time (t5-t6), the vehicle is accelerating during the time (t8-t9), so that the exhaust thermoelectrically generated power ($W_{TG}$) increases. Similar to the time (t51), the exhaust thermoelectrically generated power ($W_{TG}$) exceeds the vehicle power consumption at a time (t81), and thus the alternator generated power is reduced to 0 (zero). The voltage control is performed at the regulated voltage ($V_{u\_reg}$) by the inverter 5d.

During the time (t9-t10), the vehicle is decelerating as during the time (t7-t8), so that the regenerative deceleration signal is at the active level (H). Therefore, the exhaust thermoelectrically generated power ($W_{TG}$) is reduced to 0 (zero), and the regulated voltage set for the alternator-regulator 3 is changed to the voltage of $V_{u\_reg}$ ($= V_{a\_reg} + \alpha$) to perform the power generation through the regenerative deceleration by the alternator-regulator 3.

After the time (t10), the vehicle is idled similar to the time (t4-t5). During a time (t10-t101), the engine coolant temperature ($T_w$) rises as a result of setting the exhaust thermoelectrically generated power ($W_{TG}$) at 0 (zero) during the time (t9-t10), which is immediately before the time (t10-t101). For this reason, as can be seen from the time chart in FIG. 4, the exhaust thermoelectrically generated power ($W_{TG}$) is slightly larger than the case of being uncontrolled.

As above, while the regenerative deceleration power is being supplied to the power supply bus 12 through the regenerative deceleration, the exhaust thermoelectric generation controlling means 6 restricts (sets at 0 (zero)) the exhaust thermoelectrically generated power ($W_{TG}$) (or, the exhaust thermoelectric generation itself).

That is, because the regenerative deceleration power cannot be stored without a certain means for storing it, it is preferable that the regenerative deceleration power should be received as much as possible when it is supplied to the power supply bus 12. On the other hand, since the exhaust thermoelectrically generated power is produced from exhaust heat energy, the exhaust heat energy is stored unless it is actively drawn from the heat source.

Therefore, while the regenerative deceleration power is being supplied to the power supply bus 12, the exhaust heat energy can be stored with as much regenerative deceleration power as possible being received by the power supply bus 12, as a result of restraining the exhaust thermoelectrically generated power ($W_{TG}$). Accordingly, energy can be recovered efficiently, thereby improving gas mileage of the vehicle.

Thus far, the preferable embodiment of the present invention has been described. Nevertheless, the present invention is not by any means limited to the above embodiment, and it can be embodied by making various changes without departing from the scope of the invention.

(First Modification)

Figure 6:
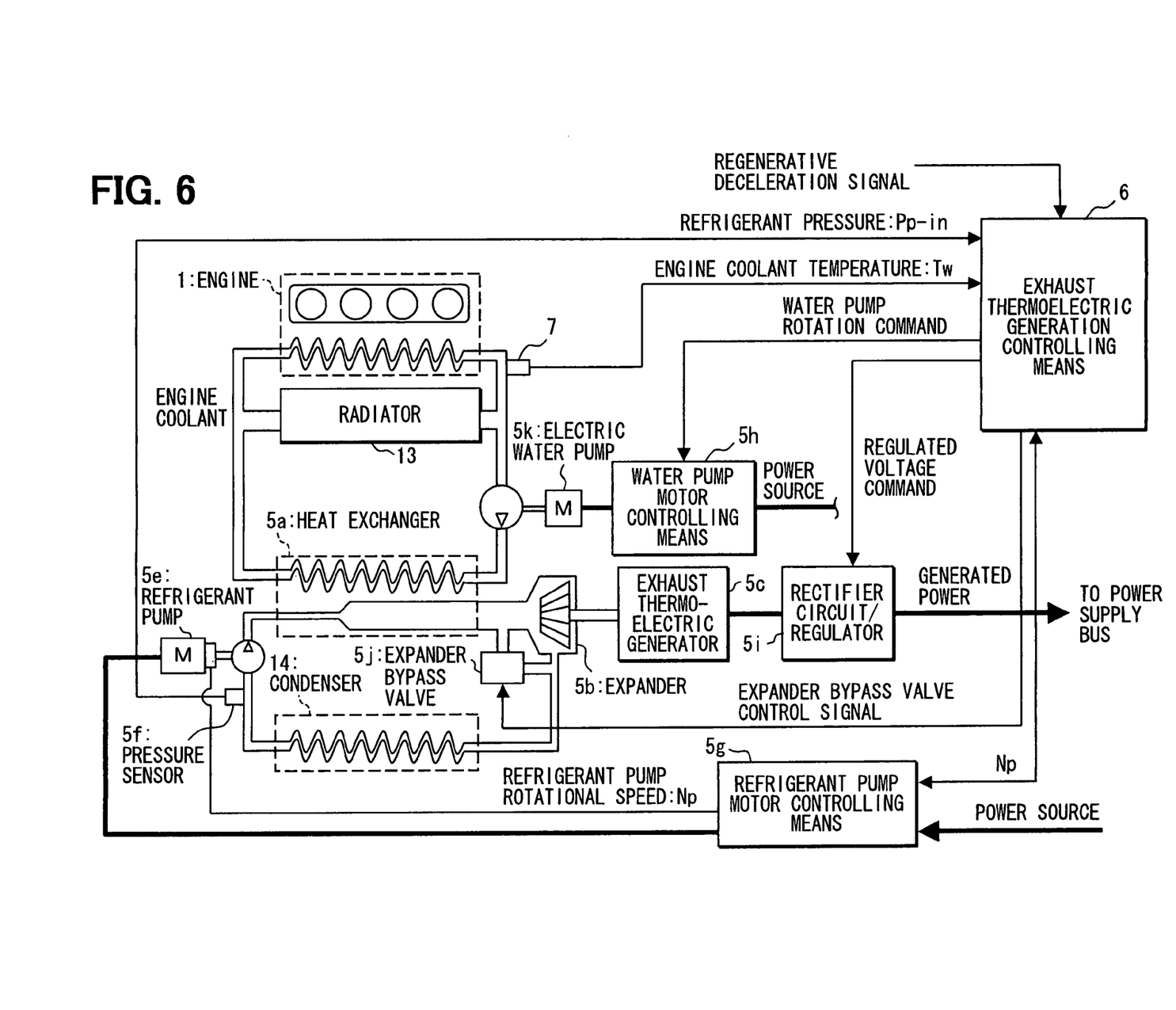
FIG. 6 is a schematic diagram illustrating a construction of the exhaust thermoelectric generating means according to a first modification to the embodiment of the present invention.

FIG. 6 shows a construction of the exhaust thermoelectric generating means 5 according to the present modification. The present exhaust thermoelectric generating means 5 includes a rectifier circuit/regulator 5i in place of the inverter 5d, and as the exhaust thermoelectric generator 5c, employs a generator (e.g., an alternator) that can control an output by controlling a field current. As the rotational speed of the exhaust thermoelectric generator 5c cannot be directly controlled by the construction of the present exhaust thermoelectric generating means 5, the exhaust thermoelectrically generated power ($W_{TG}$) is regulated by controlling the rotational speed of the refrigerant pump 5e.

However, control of the rotational speed of the refrigerant pump 5e through the refrigerant causes a slow response. Because of this, in the present modification, in order to set the exhaust thermoelectrically generated power ($W_{TG}$) at 0 (zero) while the vehicle is decelerating, a regulated voltage ($V_{t\_reg}$) of the rectifier circuit/regulator 5i is changed to a voltage (a fourth threshold voltage) (VL=approximately 10[V]) that is even lower than a lower limit of a range of the bus voltage (VB); which is normally used by the power supply bus 12. As a result, if the regenerative deceleration power is supplied to the power supply bus 12, a supply of the exhaust thermoelectrically generated power ($W_{TG}$) can be restricted to approximate this regulated voltage (VL).

Moreover, the present exhaust thermoelectric generating means 5 has a bypass passage that bypasses the expander 5b between its inlet and outlet for the refrigerant, and an expander bypass valve 5j, which opens and closes the bypass passage.

Figure 7:
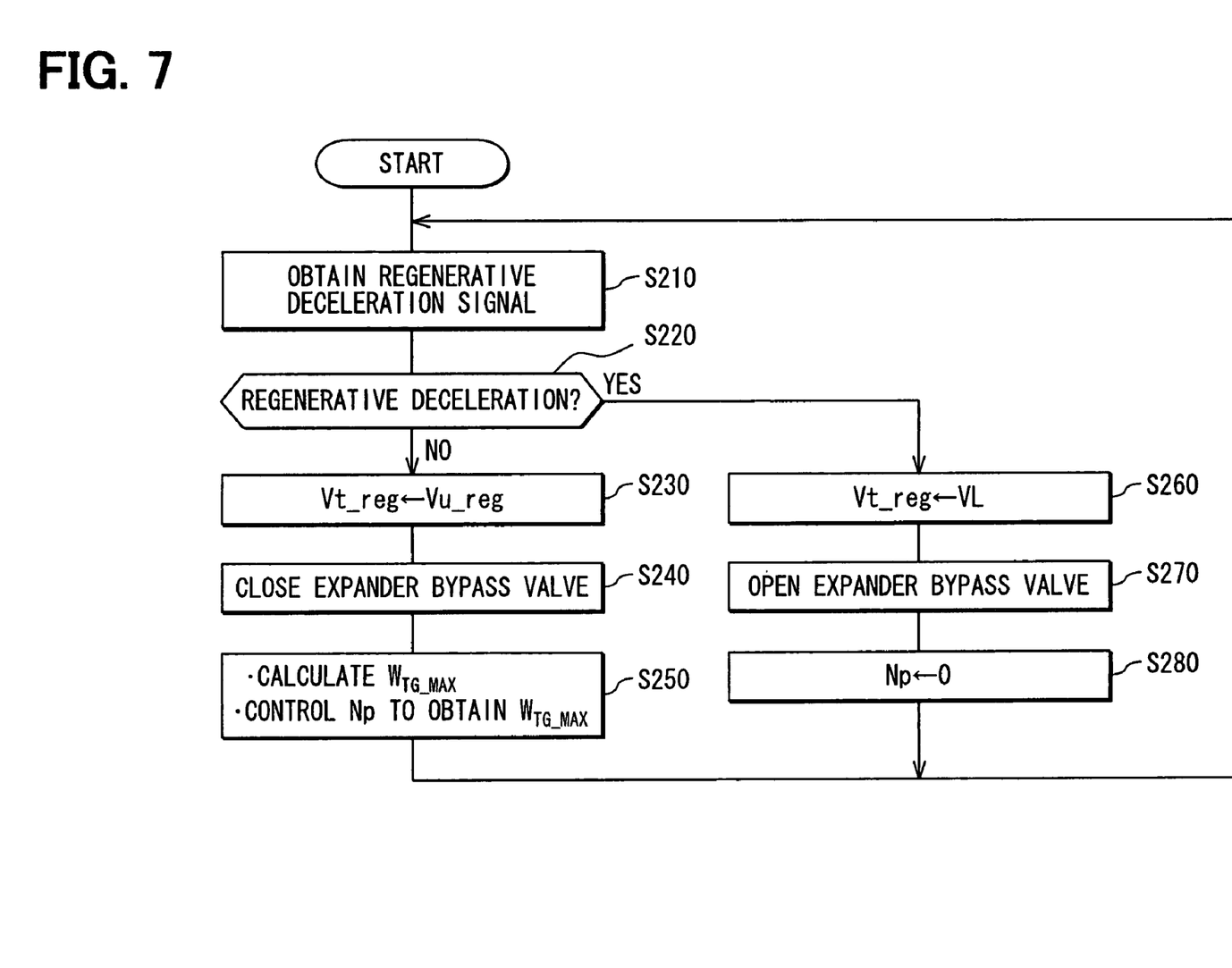
FIG. 7 is a flowchart showing a flow of power generation control processing in the exhaust thermoelectric generation controlling means according to the first modification to the embodiment of the present invention.

FIG. 7 shows control processing by the exhaust thermoelectric generation controlling means 6 of the present modification. In this control processing, the maximum power supply capacity ($W_{TG\_MAX}$) of the exhaust thermoelectric generating means 5 and the exhaust thermoelectrically generated power ($W_{TG}$) are not controlled. Instead, the regulated voltage ($V_{t\_reg}$) of the rectifier circuit/regulator 5i is changed, the expander bypass valve 5j is controlled, and the rotational speed of the refrigerant pump 5e is controlled.

To begin with, the regenerative deceleration signal is obtained at step S210. At step S220, it is determined whether the vehicle is decelerating (or descending the slope). If the regenerative deceleration signal is at the active level (H) (S220: Yes), the vehicle is determined to be decelerating, and control proceeds to step S260, whereas if the signal is at the passive level (L) (S220: No), the vehicle is determined to not be decelerating (i.e., accelerating or running at a constant speed) and control proceeds to step S230.

At step S230, the regulated voltage ($V_{t\_reg}$) of the rectifier circuit/regulator 5$i$ is set at a voltage ($V_{t\_reg}$ (=$V_{a\_reg}$+α)), which is slightly higher than the regulated voltage ($V_{a\_reg}$) of the alternator-regulator 3.

At step S240, the expander bypass valve 5$j$ is closed. At step S250, the maximum power supply capacity ($W_{TG\_MAX}$) of the exhaust thermoelectric generator 5$c$ is calculated, such that the maximum power supply capacity ($W_{TG\_MAX}$) does not exceed the regulated voltage ($V_{t\_reg}$), and the refrigerant pump rotational speed ($N_p$) is controlled so that the exhaust thermoelectric generator 5$c$ generates electricity at the maximum power supply capacity ($W_{TG\_MAX}$). As a result, the exhaust thermoelectric generator 5$c$ generates electricity, such that the exhaust thermoelectrically generated power ($W_{TG}$) is reduced to 0 (zero) while the vehicle is decelerating, and that the regulated voltage ($V_{t\_reg}$) coincides with a voltage of ($V_{u\_reg}$) in any other operational state of the vehicle.

Besides, if the exhaust thermoelectrically generated power ($W_{TG}$) is smaller than the vehicle power consumption and accordingly the bus voltage (VB) does not increase to a voltage of ($V_{a\_reg}$), the alternator-regulator 3 generates electricity from the engine mechanical power to balance the rest of the vehicle power consumption, thereby keeping the bus voltage (VB) at the voltage of ($V_{a\_reg}$). Meanwhile, if the exhaust thermoelectrically generated power ($W_{TG}$) is equal to or larger than the vehicle power consumption, the bus voltage (VB) is kept at a voltage of ($V_{u\_reg}$), which is higher than the voltage of ($V_{a\_reg}$), so that the alternator-regulator 3 does not generate electricity from the engine mechanical power.

At step S260, the regulated voltage ($V_{t\_reg}$) of the rectifier circuit/regulator 5$i$ is set at the voltage (VL) that is even lower than the lower limit of the range of the bus voltage (VB), which is normally used by the power supply bus 12. At step S270, the expander bypass valve 5$j$ is opened. At step S280, the rotational speed ($N_p$) of the refrigerant pump 5$e$ is reduced to 0 (zero) to stop the refrigerant flowing into the expander 5$b$, thereby stopping the exhaust thermoelectric generator 5$c$ rotating. Consequently, the exhaust thermoelectrically generated power ($W_{TG}$) can be restricted in immediate response to a start of supply of the regenerative deceleration power.

Figure 8:
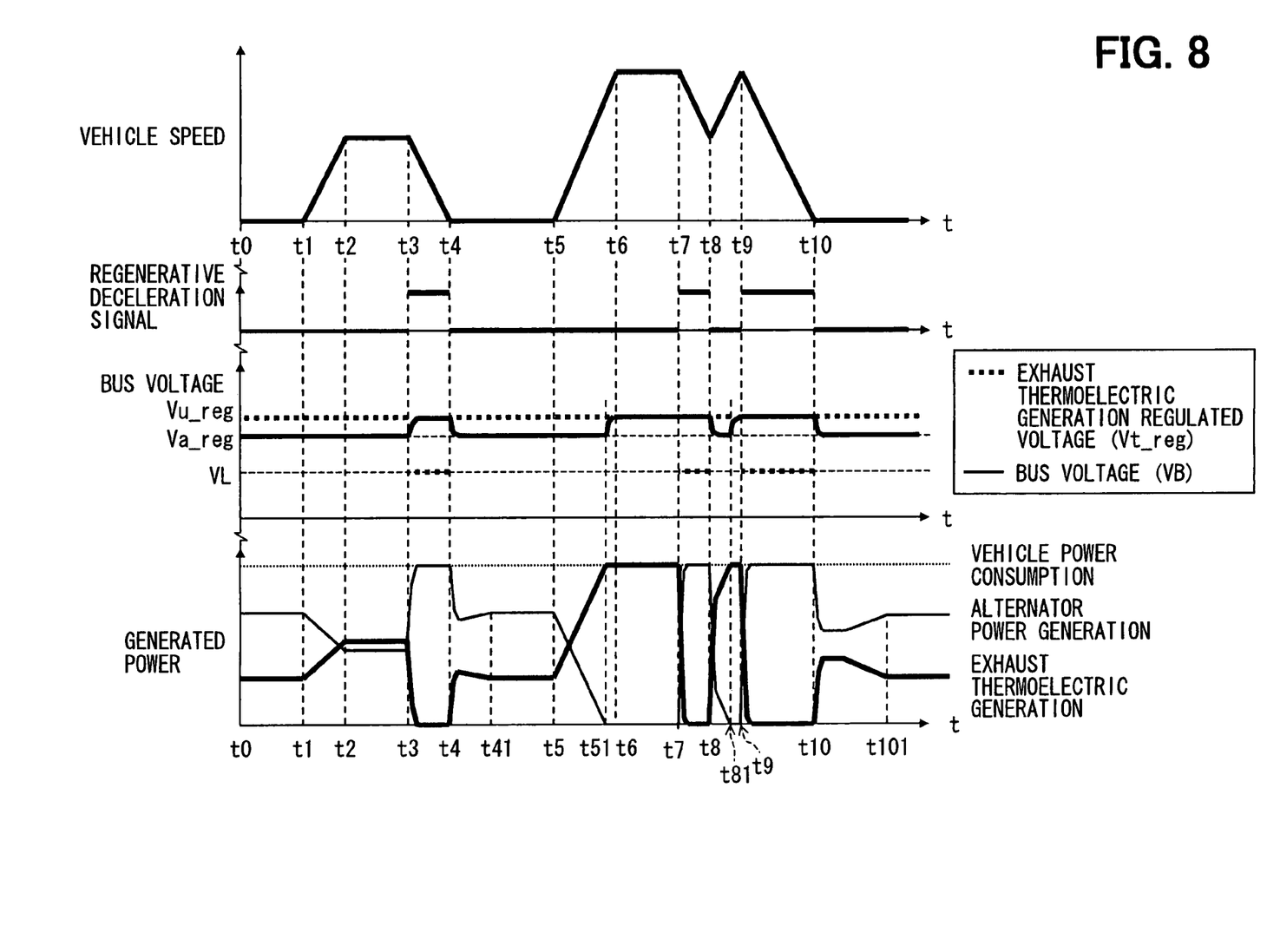
FIG. 8 is a time chart showing time transient of generated power by means of alternator power generation and exhaust thermoelectric generation according to the first modification to the embodiment of the present invention.

FIG. 8 illustrates an operation of an electric system of the vehicle corresponding to the running pattern of the vehicle with a time chart according to the present modification. Since the operation of the electric system is similar to that of the above embodiment, which is illustrated with the time chart in FIG. 4, except that the regulated voltage ($V_{t\_reg}$) of the rectifier circuit/regulator 5$i$ is changed during the regenerative deceleration, its description will be omitted.

(Second Modification)

Figure 9:
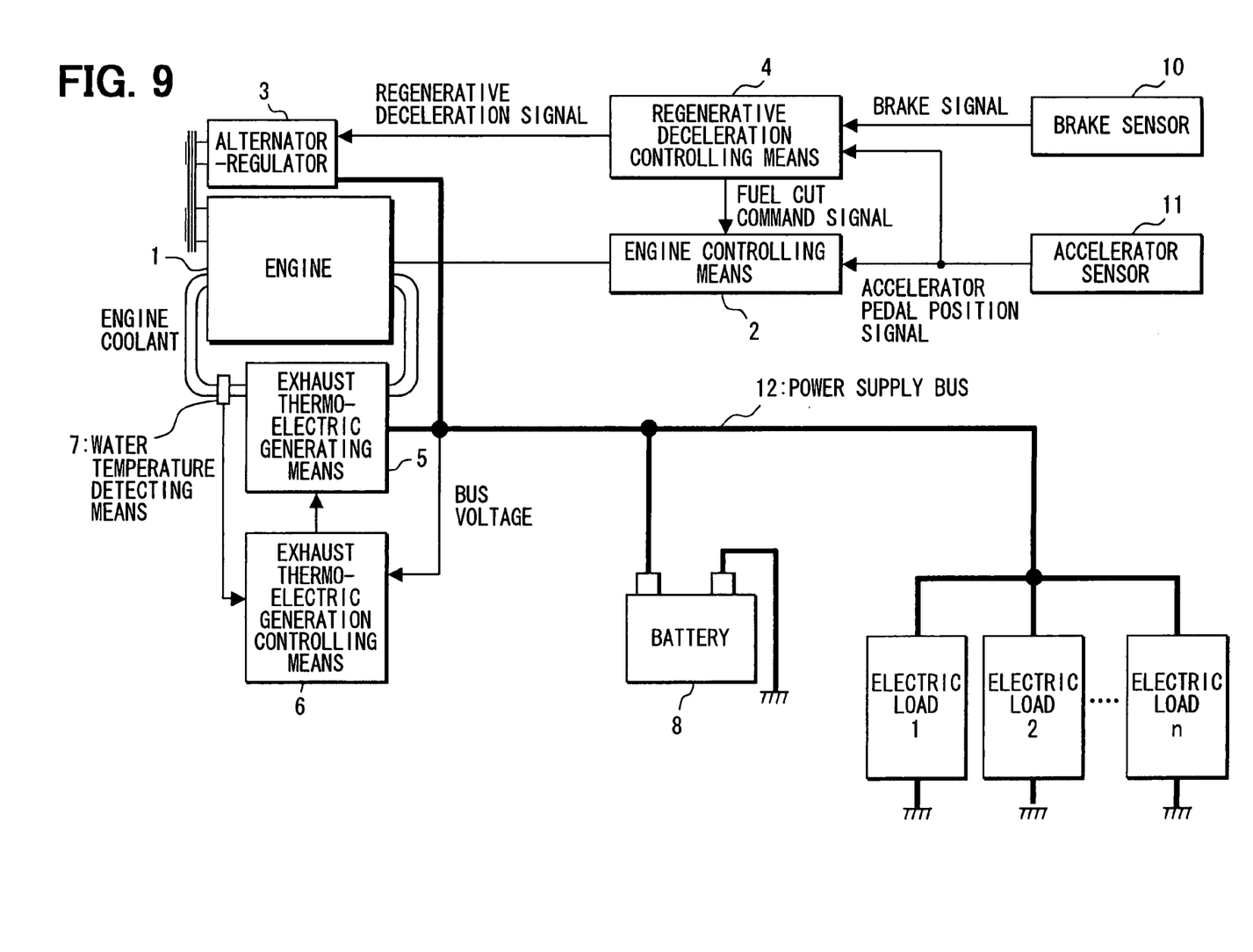
FIG. 9 is a block diagram showing an electric system of a vehicle according to a second modification to the embodiment of the present invention.

FIG. 9 is a block diagram showing an electric system of the vehicle according to the present modification. A construction of the present modification is similar to that in FIG. 1, except that the low-pass filter 9 shown in FIG. 1 and a regenerative deceleration signal line that inputs into the exhaust thermoelectric generation controlling means 6 via the low-pass filter 9 are omitted.

In the present modification, the regulated voltage ($V_{t\_reg}$) that is set for the exhaust thermoelectric generating means 5 is set at a constant voltage irrespective of the vehicle speed. Instead, the regulated voltage of the alternator-regulator 3 is changed to a voltage of ($V_{a\_reg}$) in the case of the power generation from the engine mechanical power, or to a voltage of ($V_{u\_reg}$) in the case of the power generation through the regenerative deceleration. Then, the present modification is designed to satisfy the following relationship.

$$(V_{a\_reg}) < (V_{t\_reg}) < (V_{u\_reg})$$

As can be seen from the above relationship, the regulated voltage ($V_{t\_reg}$) that is set for the exhaust thermoelectric generating means 5 is larger than the regulated voltage ($V_{a\_reg}$) set for the power generation from the engine mechanical power, and is smaller than the regulated voltage ($V_{u\_reg}$) set for the power generation through the regenerative deceleration. Accordingly, if the vehicle is not decelerating, and the exhaust thermoelectrically generated power ($W_{TG}$) is relatively large, the bus voltage of the power supply bus 12 can be kept at the regulated voltage ($V_{t\_reg}$) by means of the exhaust thermoelectrically generated power ($W_{TG}$).

Figure 10:
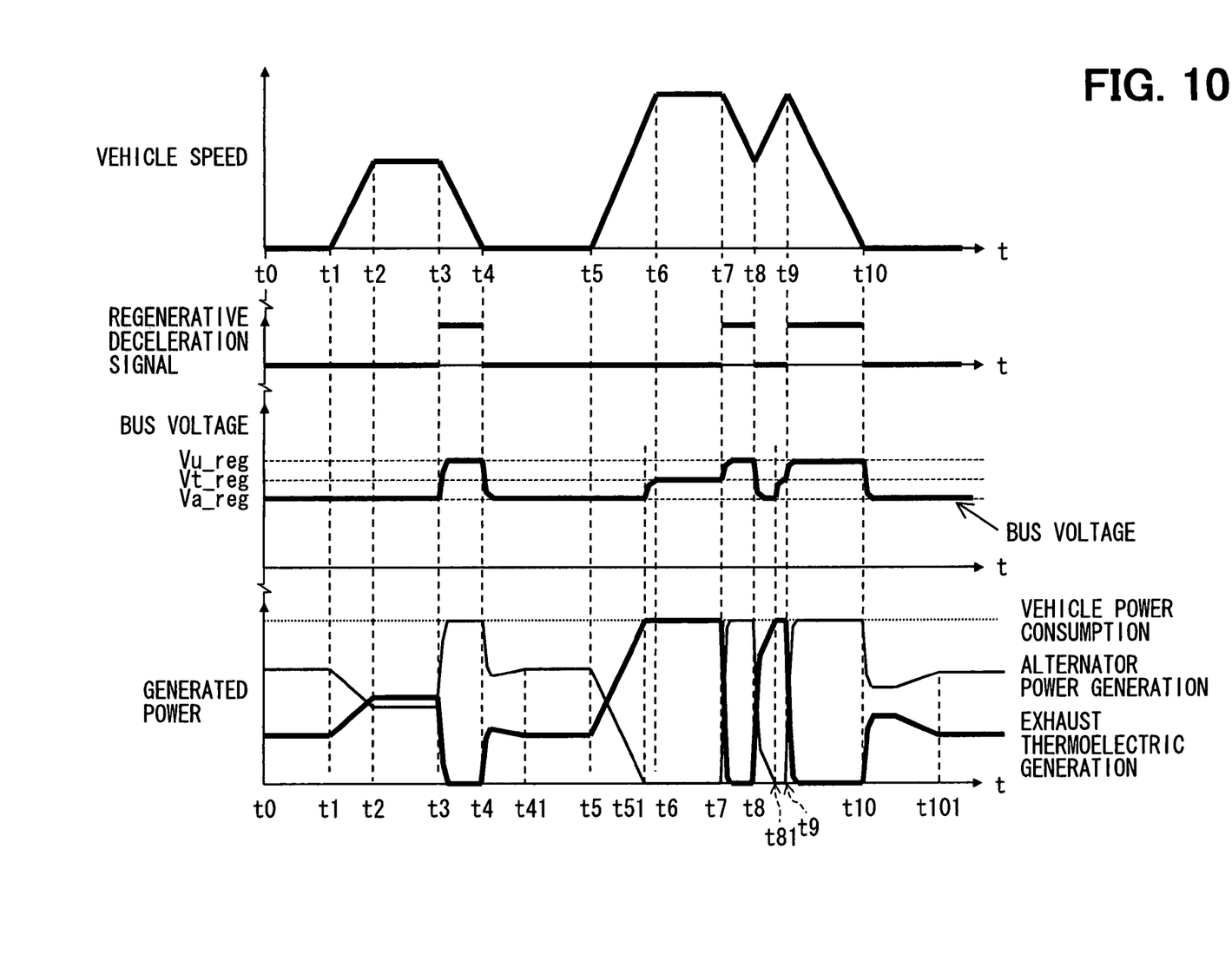
FIG. 10 is a time chart showing time transient of generated power by means of alternator power generation and exhaust thermoelectric generation according to the second modification to the embodiment of the present invention.

FIG. 10 illustrates the operation of the electric system of the vehicle corresponding to the running pattern of the vehicle with a time chart according to the present modification. During a time (t0-t3), (t4-t51), (t8-t81), and after a time (t10), the vehicle is not decelerating, and the exhaust thermoelectrically generated power ($W_{TG}$) is smaller than the vehicle power consumption. In consequence, the alternator-regulator 3 generates electricity from the engine mechanical power to balance the rest of the vehicle power consumption, thereby keeping the bus voltage (VB) of the power supply bus 12 at the regulated voltage ($V_{a\_reg}$).

During a time (t3-t4), (t7-t8), (t9-t10), the vehicle is decelerating. Hence, the alternator-regulator 3 generates electricity from the kinetic energy, which is produced from the vehicle deceleration, thereby keeping the bus voltage (VB) of the power supply bus 12 at the regulated voltage ($V_{u\_reg}$) that is set for the power generation through the regenerative deceleration. In this case, since the regulated voltage ($V_{u\_reg}$) is larger than the regulated voltage ($V_{t\_reg}$) that is set for the exhaust thermoelectric generating means 5, the exhaust thermoelectric generation is automatically stopped, so that the electricity is not generated.

During a time (t51-t7), (t81-t9), the vehicle is not decelerating, and the exhaust thermoelectrically generated power ($W_{TG}$) covers the entire vehicle power consumption, and therefore the exhaust thermoelectric generating means 5 generates electricity to keep the bus voltage (VB) at the regulated voltage ($V_{t\_reg}$).

(Third Modification)

Figure 11:
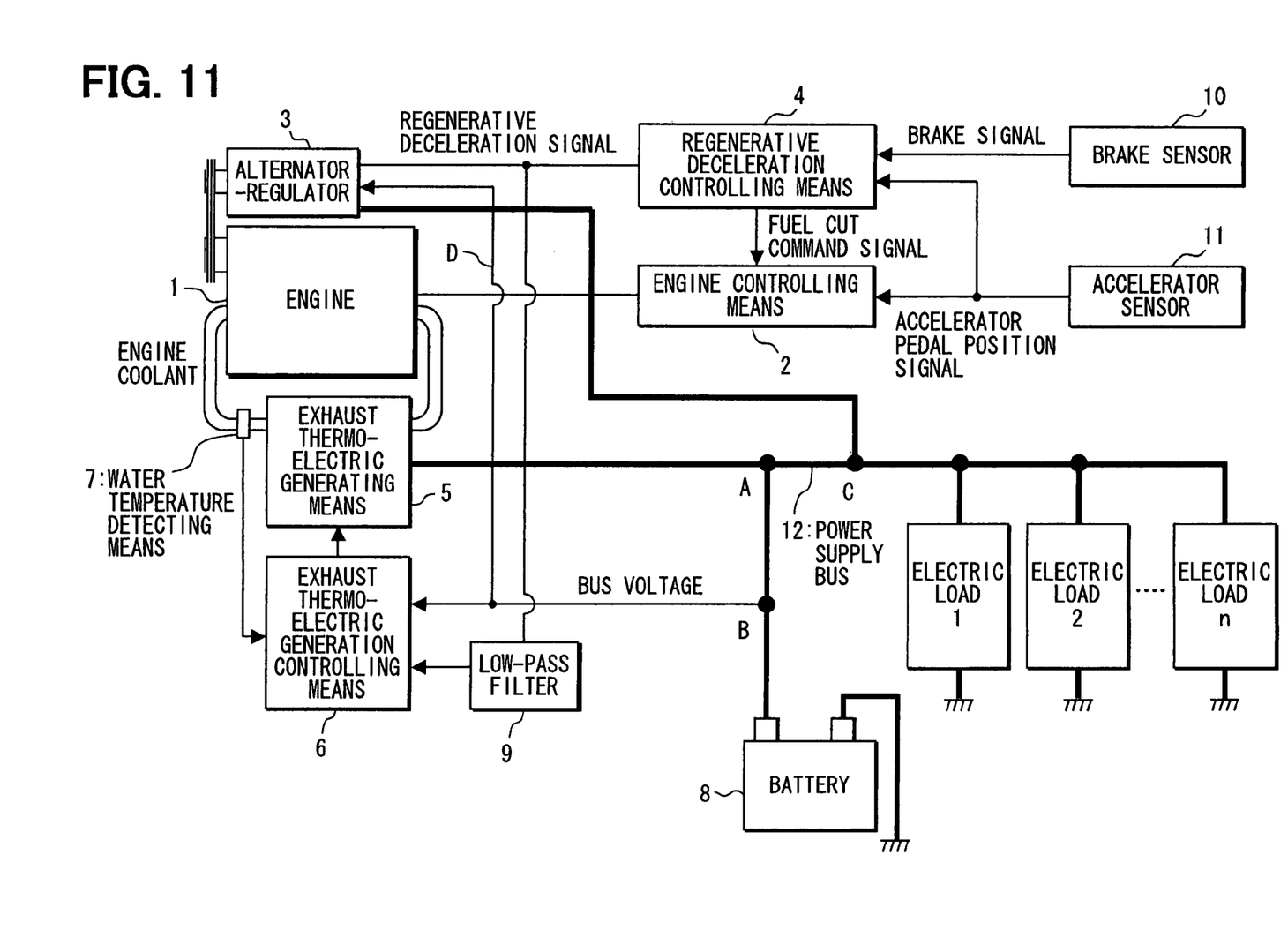
FIG. 11 is a block diagram showing an electric system of a vehicle according to third and fourth modifications to the embodiment of the present invention.

In the case where a bus voltage detecting means for detecting the bus voltage (VB) of the power supply bus 12 is included in an electric system of the vehicle, which is shown in FIG. 11, it is preferable that the bus voltage detecting means should detect the bus voltage (VB) at a point B, which is located closer to the battery 8 than a connecting part (C), at which a power line running from the alternator-regulator 3 is connected to the power supply bus 12, and a connecting part (A), at which a power line running from the exhaust thermoelectric generating means 5 is connected to the power supply bus 12. In other words, it is preferable that the bus voltage detecting means should be located at least on a battery 8 side of the connecting part A of a power line running from the battery 8 and the power line running from the exhaust thermoelectric generating means 5.

By virtue of this arrangement of the bus voltage detecting means, an influence of a disturbance can be made relatively small, and the bus voltage (VB) can be detected accurately and stably, thereby stabilizing control of the power generation. In addition, the above arrangement can be applied to detection of a voltage of the alternator-regulator 3 (D in FIG. 11).

(Fourth Modification)

As shown in the electric system of the vehicle in FIG. 11, it is preferable that the connecting part A of the power line running from the exhaust thermoelectric generating means 5 and the power supply bus 12 should be located closer to the battery 8 than the connecting part C of the power line running from the alternator-regulator 3 and the power supply bus 12. In other words, it is preferable that the connecting part C should be located on an electric loads side of the connecting part A.

Generally, the exhaust thermoelectrically generated power ($W_{TG}$) by the exhaust thermoelectric generating means 5 is smaller than the alternator generated power through the engine mechanical power by the alternator-regulator 3. Therefore, by locating the connecting part A closer to the battery 8 than the connecting part C in order to make as short as possible a part of the power line, through which a strong electric current passes between the alternator-regulator 3 and the electric loads of the power supply bus 12, a power loss can be made relatively small. Furthermore, an influence of noise generated from the inverter 5d of the exhaust thermoelectric generating means 5 upon the electric loads can be restricted.

(Fifth Modification)

For example, the regulated voltage ($V_{a\_reg}$) of the alternator-regulator 3 may be made constant, and the regulated voltage ($V_{t\_reg}$) set for the exhaust thermoelectric generating means 5 may be changed. That is, the regulated voltage ($V_{t\_reg}$) that is set for the exhaust thermoelectric generating means 5 may be controlled, such that a voltage of a power supply system does not exceed a predetermined upper limit.

Accordingly, a certain means that is involved in the exhaust thermoelectric generation can be added afterward to the power supply system of an existing vehicle. Moreover, since the voltage of the power supply system can be restricted such that it does not exceed the upper limit because of a surplus of the exhaust thermoelectrically generated power ($W_{TG}$), the alternator generated power through the engine mechanical power by the alternator-regulator 3, and the thermoelectrically generated power can be received at once. Furthermore, an overcharge of the battery 8 can be restricted if the battery 8 is connected to the power supply system. As a result, it is expected that the exhaust heat energy may be efficiently recovered to improve the gas mileage of the vehicle.

Additionally, it is preferable that the exhaust thermoelectric generation controlling means 6 should control the exhaust thermoelectrically generated power ($W_{TG}$), such that it does not exceed an upper limit, which is higher than a predetermined regulated voltage that is set for the exhaust thermoelectric generating means 5. As a consequence, even if the exhaust thermoelectrically generated power ($W_{TG}$) is relatively large, it can be exploited within a range in which it does not exceed this upper limit, and the voltage of the power supply system can be stabilized.

(Sixth Modification)

The battery 8 is not limited to a battery (e.g., a lead battery) that is poor in receiving a charge, but a high-performance battery (e.g., a lithium battery and a nickel metal hydride (NiMH) battery) that is good in receiving the charge, may be employed as the battery 8. In employing such a high-performance battery, even if it does not have the capacity of receiving the regeneration power because a remaining capacity is nearly fully charged, or even if it has a small capacity for cost reduction, or the like, an application of the present invention is effective.

(Seventh Modification)

For instance, if the vehicle of the present embodiment is a hybrid electric vehicle, it may include a means for transforming the exhaust thermoelectrically generated power ($W_{TG}$) that is supplied to the power supply system of the hybrid electric vehicle, into electric power to drive the hybrid electric vehicle. Consequently, the exhaust thermoelectrically generated power ($W_{TG}$) can be used as the electric power to drive the hybrid electric vehicle by supplying the exhaust thermoelectrically generated power ($W_{TG}$) to the power supply system of the hybrid electric vehicle.

(Eighth Modification)

In addition to the exhaust thermoelectric generating means that is employed through the use of the condensation-expansion Rankine cycle of the refrigerant, the present power supply control system may be applied to a thermoelectric conversion means or apparatus through the use of, for example, the Seebeck effect and the like. That is, the exhaust thermoelectric generation may be stopped during the regenerative deceleration in order to store heat. Accordingly, the gas mileage of the vehicle may also be improved.

Additional advantages and modifications will readily occur to those skilled in the art. The invention in its broader terms is therefore not limited to the specific details, representative apparatus, and illustrative examples shown and described.

What is claimed is:

1. A power supply control system for a vehicle, comprising:
   a supply line system;
   a first electric generating means for generating electricity through use of a mechanical drive force of a drive source of the vehicle, which drives the vehicle to run, wherein the first electric generating means is connected to the supply line system;
   a second electric generating means for generating electricity through use of a heat energy, wherein the second electric generating means is connected to the supply line system; and
   a control means for controlling the first electric generating means and the second electric generating means, wherein:
   the control means operates the first electric generating means to generate the electricity when a voltage of the supply line system is below a first threshold voltage;
   the control means stops the first electric generating means when the voltage of the supply line system is equal to or greater than the first threshold voltage;
   the control means operates the second electric generating means to generate the electricity when the voltage of the supply line system is below a second threshold voltage, which is different from the first threshold voltage; and
   the control means stops the second electric generating means when the voltage of the supply line system is equal to or greater than the second threshold voltage.

2. The power supply control system according to claim 1, wherein the second threshold voltage is higher than the first threshold voltage.

3. The power supply control system according to claim 1, further comprising a voltage detecting means for detecting the voltage of the supply line system, wherein the voltage detecting means detects the voltage at a point, which is located closer to a battery that is connected to the supply line system than a first connecting part, at which a first power line running from the first electric generating means is connected to the supply line system, and a second connecting part, at which a second power line running from the second electric generating means is connected to the supply line system.

4. The power supply control system according to claim 3, wherein the second connecting part is located closer to the battery than the first connecting part.

5. The power supply control system according to claim 1, wherein the second electric generating means includes a means for generating the electricity by driving a thermoelectric generator, which generates the electricity using a kinetic energy produced through at least one of expansion and condensation of a heat transmission medium, the expansion and the condensation being produced from the heat energy.

6. The power supply control system according to claim 5, wherein the heat transmission medium is a refrigerant of an air conditioner that is installed in the vehicle, the power supply control system further comprising:
   an electric power calculating means for calculating a maximum power generation capacity that the second electric generating means is able to generate, from a pressure, a flow, and a temperature of the refrigerant before the expansion of the refrigerant;
   a refrigerant pump that applies pressure on the refrigerant to be circulated; and
   a means for controlling a rotational speed of the thermoelectric generator, a rotary torque of the thermoelectric generator, and a rotational speed of the refrigerant pump to output the maximum power generation capacity calculated by the electric power calculating means.

7. The power supply control system according to claim 5, further comprising:
   a flow passage bypassing means for bypassing a flow passage of the heat transmission medium in the thermoelectric generator; and
   a bypass flow controlling means for controlling a flow of the heat transmission medium that flows through the flow passage bypassing means, wherein the control means limits the electricity generated through the use of the heat energy by running the heat transmission medium through the flow passage bypassing means.

8. The power supply control system according to claim 1, wherein the vehicle is a hybrid electric vehicle, the power supply control system further comprising a means for transforming the electricity generated by the second electric generating means, which is supplied to a supply line system of the hybrid electric vehicle, into electricity to drive the hybrid electric vehicle.

* * * * *